(12) United States Patent (10) Patent No.: US 8,491,201 B2
Kossat et al. (45) Date of Patent: Jul. 23, 2013

(54) APPARATUS FOR SPLICING OF OPTICAL WAVEGUIDE SECTIONS

(75) Inventors: Rainer Matthias Kossat, Aschau (DE); Bert Zamzow, Gauting-Buchendorf (DE)

(73) Assignee: CCS Technology, Inc., Wilmington, DE (US)

( * ) Notice: Subject to any disclaimer, the term of this patent is extended or adjusted under 35 U.S.C. 154(b) by 381 days.

(21) Appl. No.: 12/833,063

(22) Filed: Jul. 9, 2010

(65) Prior Publication Data

US 2010/0269323 A1 Oct. 28, 2010

Related U.S. Application Data

(60) Division of application No. 12/360,898, filed on Jan. 28, 2009, now Pat. No. 7,753,597, which is a continuation of application No. PCT/EP2007/058039, filed on Aug. 2, 2007.

(30) Foreign Application Priority Data

Aug. 3, 2006 (DE) .......................... 10 2006 036 330

(51) Int. Cl.
*G02B 6/255* (2006.01)
(52) U.S. Cl.
USPC ................... 385/98; 385/95; 385/97; 385/99; 385/96; 385/134; 385/135; 385/136; 385/137
(58) Field of Classification Search
USPC ...................................... 385/95–99, 134–137
See application file for complete search history.

(56) References Cited

U.S. PATENT DOCUMENTS

| 4,416,506 | A | 11/1983 | Johnson et al. ............. 350/96.21 |
| 6,116,793 | A | 9/2000 | Finzel et al. ..................... 385/99 |
| 6,814,124 | B2 | 11/2004 | Esmaeili ........................ 156/502 |
| 2006/0029339 | A1* | 2/2006 | Marazzi ........................... 385/96 |
| 2006/0233509 | A1 | 10/2006 | Ray et al. ....................... 385/136 |
| 2008/0310812 | A1* | 12/2008 | Watte et al. .................... 385/137 |

FOREIGN PATENT DOCUMENTS

| CA | 1112302 | 11/1981 |
| DE | 10113740 | 7/2002 |
| EP | 0887671 | 12/1998 |
| EP | 0899594 | 3/1999 |
| JP | 6-109946 | 4/1994 |
| WO | WO 00/65388 | 11/2000 |
| WO | WO 2006/082355 | 8/2006 |
| WO | WO 2006/112675 | 10/2006 |

* cited by examiner

*Primary Examiner* — Queenie Dehghan
(74) *Attorney, Agent, or Firm* — Timothy J. Aberle

(57) ABSTRACT

An apparatus for splicing of optical waveguide sections is in the form of a handheld splicer. The splicer comprises a preprocessing unit, which may comprise a plurality of processing devices for carrying out removal, cleaning and cutting steps. The optical waveguide sections are clamped in a holding apparatus and are prepared in the preprocessing unit. The holding apparatuses are inserted with the prepared optical waveguide sections into a splicing unit, where they are spliced. The spliced optical waveguide sections can be fed by means of a transfer station to a shrinking oven for shrinking a shrink sleeve on. The preprocessing unit, the splicing unit and the shrinking oven can be controlled by means of one hand of an operator, while the splicer is held with the other hand.

18 Claims, 7 Drawing Sheets

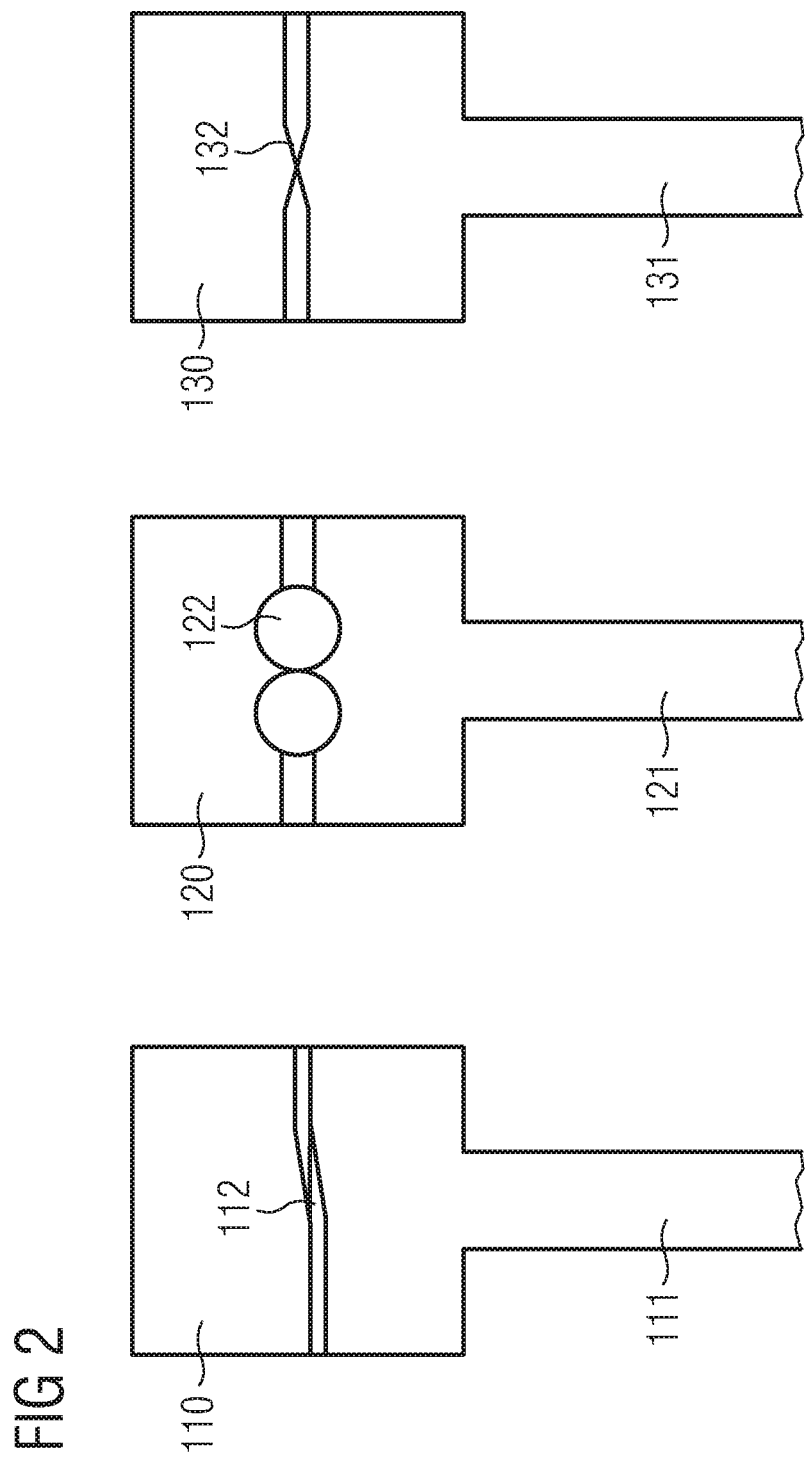

APPARATUS FOR SPLICING OF OPTICAL WAVEGUIDE SECTIONS

RELATED APPLICATIONS

This application is a Divisional of U.S. Ser. No. 12/360,898 U.S. Pat. No. 7,753,597, filed Jan. 28, 2009, which is continuation of International Application No. PCT/EP2007/058039, filed Aug. 2, 2007, which claims priority to German Application No. DE102006036330.2, filed Aug. 3, 2006, all three applications being incorporated herein by reference.

FIELD

The disclosure relates to an apparatus for splicing of optical waveguide sections, in which case the apparatus can be used as a handheld splicer. The apparatus can be held in one hand, while it is operated using the other hand. The disclosure also relates to a method for carrying out a splicing process using a handheld splicer, in which case the splicer can be operated using one hand.

TECHNICAL BACKGROUND

Optical waveguides frequently have to be spliced at points where access is difficult, for example in the area of cable junctions which are buried in the ground or on a mast. In general, not much space is available for the person carrying out the work in this case. In particular, there is often no flat surface available in order to place the splicer down at the splicing location. For example, it is thus often impossible, after exposing a cable junction in the ground, to place the splicer down close to the optical waveguides to be spliced. When splicing optical waveguides on a cable mast, there are in general likewise only very restricted options for positioning the splicer nearby in the area of the optical waveguides to be spliced.

There is therefore a need for a splicer which can be used as a handheld appliance. In the case of an appliance such as this, there should, if possible, no longer be any need to place the appliance down on a fixed base. In fact, the appliance should be operable by one hand, while the person carrying out the work can operate it using the other hand. In this case, it should be possible to carry out all the processing steps which are required to carry out a splicing process, using the handheld splicer. This relates in particular to preprocessing steps for preparation of an optical waveguide for a splicing process, such as removal of a fiber coating, cleaning of the fiber and subsequent processing of the break point with a cutter. Furthermore, of course, it should also be possible to carry out the subsequent splicing process and the shrinking of a shrink sleeve onto the splicing point using the splicer, operated with one hand.

SUMMARY

One aspect the disclosure is directed to an apparatus for splicing of optical waveguide sections which allows a splicing process to be carried out at virtually any desired points and in a manner which can be handled easily. A further aspect is a method which makes it possible to splice optical waveguide sections to one another at virtually any desired locations in a relatively simple manner.

The apparatus for splicing of optical waveguide sections includes a preprocessing unit for an optical waveguide section that prepares it for a splicing process, wherein the preprocessing unit is fitted to the apparatus for splicing. A holding apparatus is also provided for holding the optical waveguide section. The holding apparatus can be attached to the preprocessing unit for processing of the optical waveguide section. The apparatus for splicing of optical waveguide sections furthermore comprises a splicing unit for splicing of optical waveguide sections, wherein the splicing unit is fitted to the apparatus for splicing. The holding apparatus can be fitted to the splicing unit for splicing of the optical waveguide sections. The apparatus for splicing furthermore comprises a control device for controlling the apparatus for splicing. After the holding apparatus has been attached to the preprocessing unit, the optical waveguide section can be processed by activating the control device for preparation of the splicing process. Furthermore, after the holding apparatus has been attached to the splicing unit, the optical waveguide section can be spliced to a further optical waveguide section by activating the control device.

Additionally, the splicer may be operated with one hand, while a user holds the appliance firmly in the other hand. In order to prepare for the splicing process for the optical waveguide sections to be spliced, a coating of the optical waveguides is removed by means of the preprocessing unit. After this, the exposed fibers of the optical waveguide sections are cleaned in the preprocessing unit. The preparation of the optical waveguide sections for the splicing process also includes the adaptation of a break point of the optical waveguide sections. For example, splits at the break point are removed, and the break point is straightened out by means of the preprocessing unit. The splicing process comprises the alignment of the prepared optical waveguide sections in the splicing unit and the fusing of the optical waveguide sections. In order to carry out the preprocessing of the optical waveguide sections and the splicing process by means of one hand, while the splicer is held in the other hand, the preprocessing unit, the splicing unit and the control unit for controlling the preprocessing unit and the splicing unit are integrated in a housing of the apparatus for splicing of the optical waveguides. This allows relatively simple handling of the splicer particularly at splicing locations where only a small amount of space is available for a splicer to be placed down.

According to one aspect, the preprocessing unit comprises a first processing device to which the holding apparatus can be attached. The first processing device is designed such that, after the holding apparatus in which the optical waveguide section is held has been attached to the first processing device, a coating on the optical waveguide section can be removed by activating the control device.

The preprocessing unit preferably comprises a second processing device to which the holding apparatus can be attached. The second processing device is designed such that, after the holding apparatus in which the optical waveguide section is held has been attached to the second processing device, a surface of the optical waveguide section can be cleaned by activating the control device.

In a further embodiment of the apparatus, the preprocessing unit comprises a third processing device to which the holding apparatus can be attached. The third processing device is designed such that, after the holding apparatus in which the optical waveguide section is held has been attached to the third processing device, a break point in the optical waveguide section can be processed by activating the control device.

The preprocessing unit may comprise at least one insertion apparatus which is designed such that the holding apparatus can be inserted into the at least one insertion apparatus, for attaching to the preprocessing unit.

The first processing device is preferably designed such that the coating on the optical waveguide section is removed when the holding apparatus is pulled out of the insertion apparatus. The second processing device is preferably designed such that the surface of the optical waveguide section is cleaned when the holding apparatus is pulled out of the insertion apparatus.

According to another embodiment of the apparatus, the holding apparatus comprises a clamping apparatus by means of which the optical waveguide section can be clamped in the holding apparatus. In this case, the clamping apparatus may comprise a moving clamping jaw. When the clamping jaw is in a first position, the optical waveguide section can be inserted into a groove of the clamping apparatus. When the clamping jaw is in a second position, the optical waveguide section is clamped in the groove. The clamping jaw preferably assumes the first or second position by rotating an eccentric, but other suitable mechanisms are possible.

The holding apparatus preferably comprises an introduction apparatus, in which a shrink sleeve can be placed. The holding apparatus preferably comprises a guide rail by means of which the holding apparatus can be attached to the preprocessing unit and to the splicing unit.

In one development of the apparatus, a shrinking oven is provided, by means of which the shrink sleeve can be shrunk onto a splicing point of the optical waveguide section which is spliced in the splicing unit, wherein the shrinking oven is fitted to the apparatus. The apparatus for splicing furthermore comprises a bracket, which is mounted such that it can rotate and is fitted to the apparatus for splicing, wherein the optical waveguide section can be attached to the bracket which is mounted such that it can rotate. The bracket which is mounted such that it can rotate is fitted to the apparatus for splicing such that, after the bracket has been attached, the optical waveguide section can be removed from the holding apparatus by rotating the bracket to a first rotation position. Furthermore the bracket which is mounted such that it can rotate is fitted to the apparatus for splicing such that the optical waveguide section can be inserted into the shrinking oven by rotating the bracket further, starting from the first rotation position, to a second rotation position.

One embodiment of the apparatus for holding an optical waveguide section comprises a guide rail by means of which the apparatus for holding the optical waveguide can be attached to a processing unit for processing the optical waveguide section. The apparatus for holding the optical waveguide section furthermore has a clamping apparatus, by means of which the optical waveguide section can be clamped in the holding apparatus.

One embodiment of the apparatus for splicing of optical waveguide sections makes it possible to feed the optical waveguide sections which have been spliced to one another to a shrinking oven, in which case the transfer can be accomplished by single-handed operation of the splicing apparatus. The apparatus for splicing of optical waveguide sections comprises a splicing unit for splicing of the optical waveguide sections, wherein the splicing unit is fitted to the apparatus for splicing. Furthermore, at least one holding apparatus is provided for holding an optical waveguide section, and is arranged on the splicing unit. Furthermore, the apparatus for splicing of optical waveguide sections has a shrinking oven, by means of which a shrink sleeve can be shrunk onto a splicing point of the optical waveguide sections which are spliced in the splicing unit, wherein the shrinking oven is fitted to the apparatus for splicing. The apparatus furthermore comprises a bracket which is mounted such that it can rotate and is fitted to the apparatus for splicing, wherein the spliced optical waveguide sections can be attached to the bracket which is mounted such that it can rotate. The bracket which is mounted such that it can rotate is fitted to the apparatus for splicing such that, when the bracket is in a first rotation position, the spliced optical waveguide sections can be removed from the holding apparatus, after attaching to the bracket, by rotating the bracket. The bracket which is mounted such that it can rotate is, furthermore, fitted to the apparatus for splicing such that the spliced optical waveguide sections can be fed to the shrinking oven by rotating the bracket further from the first rotation position to a second rotation position.

A method for carrying out a splicing process includes providing an apparatus for splicing of optical waveguide sections, which comprises a preprocessing unit for preparing an optical waveguide section for a splicing process, and a splicing unit for splicing the optical waveguide section, wherein the preprocessing unit and the splicing unit are fitted to the apparatus for splicing. The optical waveguide section is mounted in a holding apparatus. The holding apparatus is attached to the preprocessing unit. The optical waveguide section is processed using the preprocessing unit and activating a control device. The holding apparatus is released from the preprocessing unit. The holding apparatus is attached to the splicing unit. The splicing process is carried out using the splicing unit and activating the control device, with the optical waveguide section being spliced to another optical waveguide section.

Another method for carrying out a splicing process includes providing an apparatus for splicing of optical waveguide sections having a splicing unit for splicing of the optical waveguide sections, wherein the splicing unit is fitted to the apparatus for splicing. The optical waveguide sections are mounted in a holding apparatus. The holding apparatus is attached to the splicing unit. The splicing process is carried out using the splicing unit. A bracket which is mounted such that it can rotate and is arranged on the apparatus for splicing is rotated to a first rotation position. The spliced optical waveguide sections are released from the holding apparatus and are attached to the bracket. Starting from the first rotation position, the bracket is rotated to a second rotation position in which the spliced optical waveguide sections are fed to a shrinking oven, for the shrink sleeve to be shrunk on.

Further embodiments relating to the apparatus for splicing of optical waveguide sections, to a holding apparatus for fixing an optical waveguide section, to an apparatus which makes it possible to feed optical waveguide sections which have been spliced to one another to a shrinking oven, wherein the transfer can be carried out by single-handed operation, and to a method or methods for carrying out a splicing process are specified in the dependent claims.

It is to be understood that both the foregoing general description and the following detailed description present embodiments of the disclosure, and are intended to provide an overview or framework for understanding the nature and character of the invention as it is claimed. The accompanying drawings are included to provide a further understanding, and are incorporated into and constitute a part of this specification. The drawings illustrate various embodiments, and together with the description serve to explain the principles and operation of the same.

BRIEF DESCRIPTION OF THE FIGURES

FIG. 2 shows a removal, cleaning and cutting apparatus for preparing the optical waveguide section for a splicing process.

DETAILED DESCRIPTION

Reference will now be made in detail to the preferred embodiments, examples of which are illustrated in the accompanying drawings. Whenever possible, like reference numbers will be used to refer to like components or parts.

Figure 1:
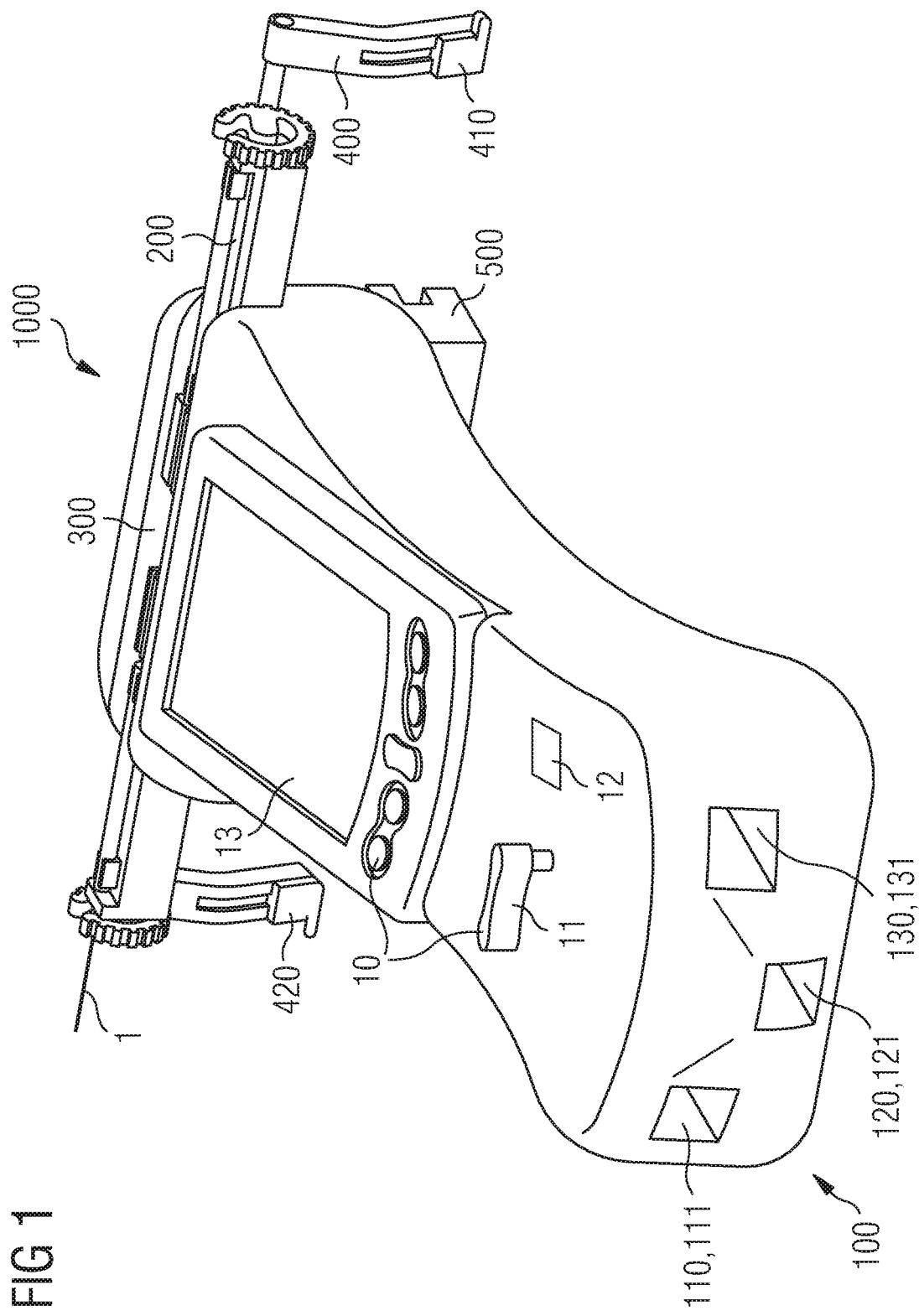
FIG. 1 shows one embodiment of an apparatus for splicing of optical waveguide sections.

FIG. 1 shows a splicer 1000 for splicing of optical waveguide sections, which can be used as a handheld appliance. The splicer can be held in one hand, while the splicer can be operated using the other hand. Since the splicer can be held in one hand while it is being operated, there is no longer any need to place the splicer down on a fixed base in order to carry out the splicing processes. The splicer disclosed therefore makes it possible to carry out a splicing process irrespective of the local circumstances.

The splicer comprises a preprocessing unit 100 which is arranged on one side of the splicer. The preprocessing unit has a plurality of processing devices 110, 120 and 130 which can be accessed by inserting an optical waveguide section into various insertion apparatuses 111, 121 and 131. While the splicer is held by an operator in one hand, the optical waveguide section to be spliced can be inserted successively into the insertion apparatuses 111, 121 and 131 using the other hand.

FIG. 2 shows the processing devices 110, 120 and 130, which are arranged in the insertion apparatuses 111, 121 and 131. The processing devices can be used to prepare the optical waveguide sections for a splicing process. First of all, an optical waveguide section to be spliced is inserted into the insertion apparatus 111. The processing device 110 which is connected to the insertion apparatus 111 is used to remove an outer coating on an optical waveguide section at the splicing point, where the optical waveguide section is intended to be spliced to another optical waveguide section. The processing device 110 is therefore in the form of a removal apparatus which, for example, comprises a cutting tool 112. The optical waveguide section is then inserted into the insertion apparatus 121, and is thus fed to the processing device 120. The fiber core which has been exposed by the processing unit 110 is cleaned in the processing device 120. The optical waveguide section is then inserted into the insertion apparatus 131, in which a processing device 130 is arranged by means of which the break point of the optical waveguide section is processed. The processing device 130 is in the form of a cutting apparatus and removes any splits at the break point, thus creating a straight break point.

Figure 3A:
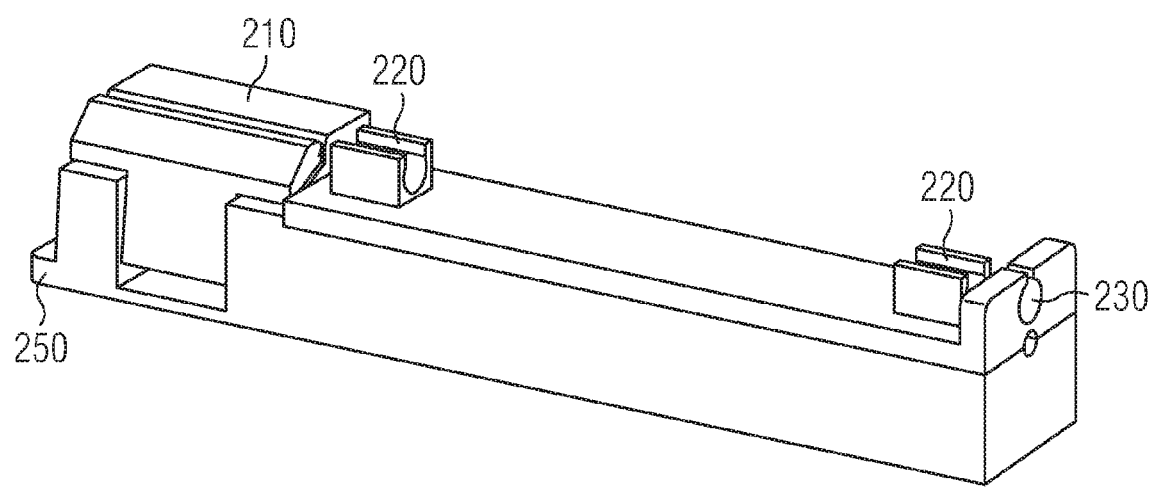
FIG. 3A shows one embodiment of a holder for holding an optical waveguide section.

The optical waveguide section to be spliced is preferably not inserted directly into the insertion apparatuses 111, 121 and 131, but is first of all clamped firmly in a holding apparatus. FIG. 3A shows a holding apparatus 200, which is in the form of an adapter, and contains, on the underneath, a guide rail 250 by means of which it can be inserted into the insertion apparatuses. The holding apparatus has a guide opening 230 into which the optical waveguide section to be spliced can be inserted. The optical waveguide section is then pushed in the direction of a clamping apparatus 210 until the end to be spliced projects out of the clamping apparatus 210.

Figure 3B:
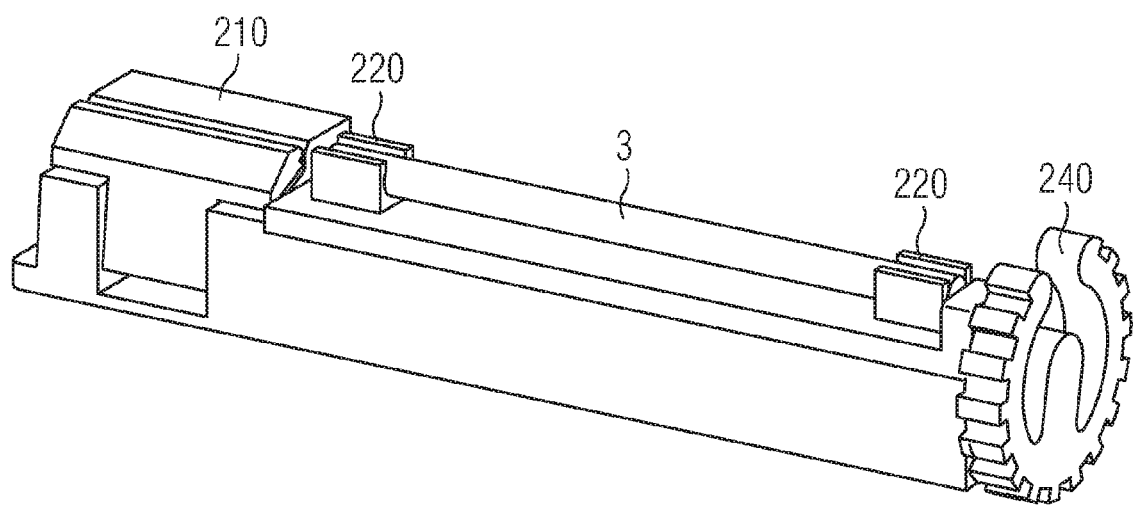
FIG. 3B shows one embodiment of a holder for holding an optical waveguide section with a shrink sleeve.

In one preferred embodiment, the holding apparatus 200 additionally comprises an introduction apparatus 220 in which a shrink sleeve 3 can be placed. FIG. 3B shows a shrink sleeve 3 which has been placed in the introduction apparatus 220. In the embodiment illustrated in FIG. 3B, the holding apparatus also comprises a rotating apparatus 240, wherein the optical waveguide section is firmly clamped by rotating the clamping wheel 240 in the clamping apparatus 210.

Figure 4:
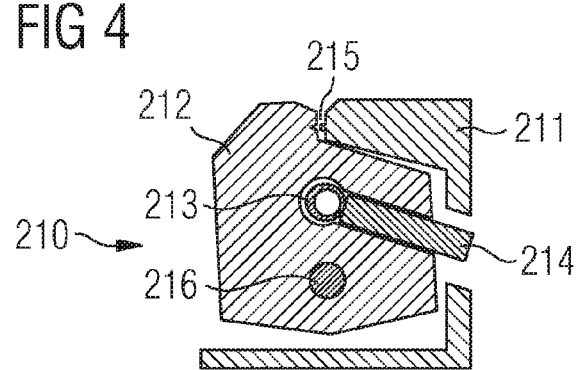
FIG. 4 shows one embodiment of a clamping apparatus for holding an optical waveguide section in a holding apparatus.
Figure 5A:
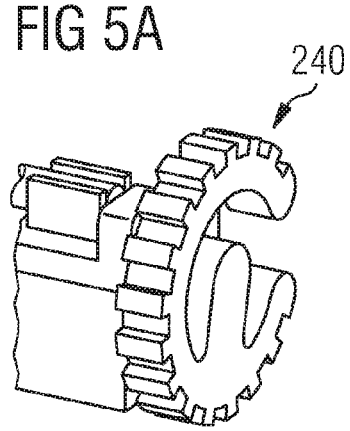
FIG. 5A shows a first position of a rotating apparatus, by means of which an optical waveguide section can be clamped in a clamping apparatus.
Figure 5B:
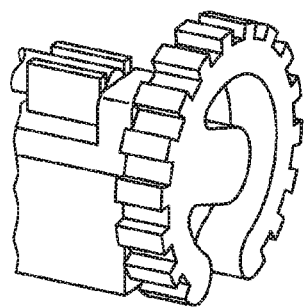
FIG. 5B shows a second position of a rotating apparatus, by means of which an optical waveguide section can be clamped in a clamping apparatus.

FIG. 4 shows a cross section of the clamping apparatus 210. The clamping apparatus comprises a moving clamping jaw 212 and a stationary part 211. When the rotating apparatus is in a first position, as is illustrated in FIG. 5A, there is a narrow groove 215, into which the optical waveguide section is inserted, between the clamping jaw 212 and the stationary part 211. When the rotating apparatus 240 is rotated to a clamping position, as is illustrated in FIG. 5B, an eccentric apparatus 213 is rotated, as a result of which the clamping jaw 212 is moved around an axis 216 in the direction of the stationary part 211. The clamping jaw 212 thus clamps an optical waveguide section that has been arranged in the groove 215 against the stationary part 211 of the clamping apparatus.

In order to prepare an optical waveguide section for a splicing process, the rotating apparatus 240 is first of all rotated to the insertion position illustrated in FIG. 5A. The optical waveguide section can be inserted into the groove 215 of the clamping apparatus 211, when the rotating apparatus is in this state, through the guide opening 230 and the shrink sleeve 3, which has previously been placed in the introduction apparatus 220. The optical waveguide section to be spliced is in this case inserted into the holding apparatus 200 until its free end projects out of the holding apparatus, or out of the clamping apparatus 210. In order to clamp the optical waveguide firmly on the holding apparatus, the rotating apparatus 240 is rotated to the clamping position illustrated in FIG. 5B. Rotating the rotating apparatus also rotates the eccentric apparatus 213, as a result of which the clamping jaw 212 firmly clamps the optical waveguide section in the groove 215. The holding apparatus 200 is then inserted into the insertion apparatus 111.

In order to at this stage allow the optical waveguide section to be inserted into the holding apparatus 200 and the shrink sleeve to be placed in the introduction apparatus 220 using one hand, the holding apparatus can be attached to the splicer 1000. A further option is to partially insert the holding apparatus into one of the insertion apparatuses, such that the adapter is held therein and the shrink sleeve can be inserted and the fiber pushed in.

Figure 6:
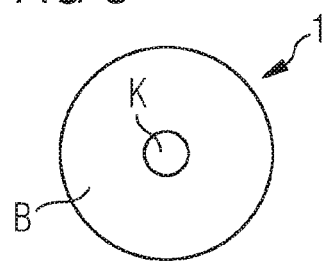
FIG. 6 shows a cross section through an optical waveguide section.

FIG. 6 shows a cross section of the optical waveguide section 1, whose end to be spliced projects out of the clamping apparatus 210. The optical waveguide section comprises a fiber core K and a coating B. In order to remove the coating B, a lever 11 of a control device 10 is arranged on the upper face of the splicing apparatus 1000. The cutting tool 112 of the processing device 110 is activated by rotating the lever, and cuts through the coating B as far as the fiber core K. The lever is in this case controlled by one hand, while the operator holds the splicer firmly using the other hand. The coating is actually removed when the holding apparatus 200 is removed from the insertion apparatus 111.

In order to clean the fiber core, the holding apparatus 200 is inserted with the fiber core K, which projects out of the clamping apparatus 210, into the insertion apparatus 121. The processing device 120 which is arranged in the insertion apparatus 121 comprises, for example, cotton-wool balls 122, as illustrated in FIG. 2, which are pressed against the fiber core by operating the lever 11. The fiber core slides past the balls, and is thus cleaned, by pulling the holding apparatus out of the insertion apparatus 121.

This cleaning process for preparing the optical waveguide section for a subsequent splicing process can also be carried out using just one hand. In this case, the adapter 200 is, for example, first of all inserted into the insertion apparatus 121, and is firmly clamped, using the right hand. The lever 11 can then be operated, likewise using the right hand, as a result of which the cleaning fibers 122 are pressed against the fiber. The adapter is then pulled out of the insertion apparatus 121 using the right hand. During these processing steps, the handheld splicer is held firmly by the operator using his free left hand.

In order to straighten out the break point or the splicing point of the optical waveguide section to be spliced and to remove any splits, the holding apparatus 200 is then inserted into the insertion apparatus 131. When the lever 11 is operated again, the break point is straightened out by means of a cutter 132 of the processing device 130, which is accessible via the insertion apparatus. The splicing apparatus can be held in one hand during this processing step as well, while the insertion of the holding apparatus into the insertion apparatus 131 and the operation of the lever 11 occur using the other hand.

The processing units can, of course, also be operated using control devices other than a lever, for example by means of a pushbutton 12.

Figure 7:
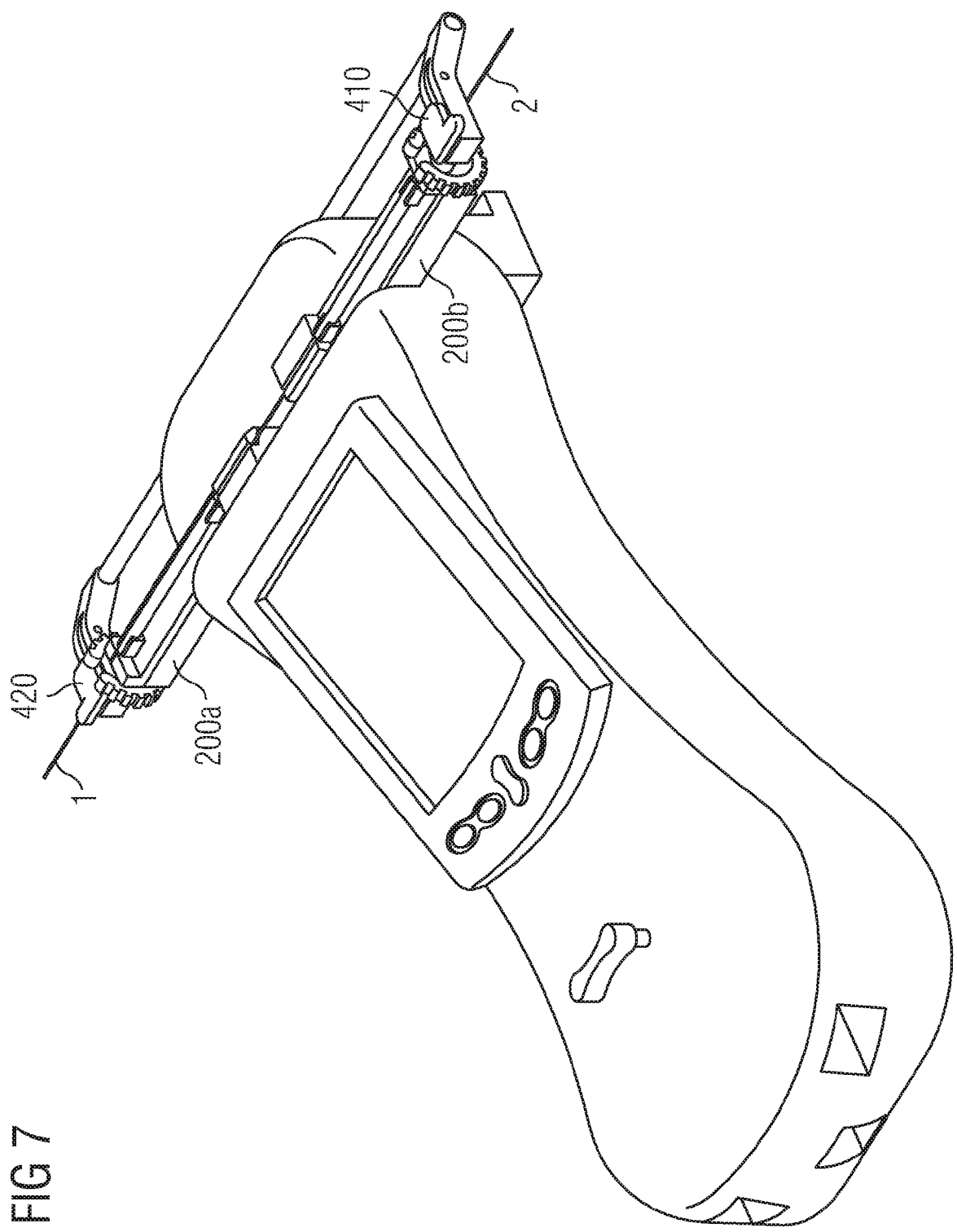
FIG. 7 shows one embodiment of an apparatus for splicing of optical waveguide sections, in which the optical waveguide sections to be spliced are inserted into a splicing unit.

Once the optical waveguide section 1, which has been fixed in the holding apparatus 200, has been prepared in this way for the splicing process, it is inserted into the actual splicing unit 300, which is located at the other end of the splicing apparatus. A further optical waveguide section 2, which is intended to be spliced to the optical waveguide section 1 that has already been prepared for the splicing process, is then likewise prepared for the splicing process by inserting it into a further holding apparatus and by removing its coating, cleaning its fiber and straightening out the break point by means of the preprocessing unit 100. After the end of the preprocessing work, the optical waveguide section 2 to be spliced is likewise inserted with the holding apparatus 200 into the splicing unit 300. FIG. 7 shows the two optical waveguide sections 1 and 2 arranged in the holding apparatuses 200a and 200b and inserted in the splicing unit 300.

The holding apparatuses 200 can likewise be inserted into the splicing unit 300 using one hand, while the operator's other hand is used to hold the splicer. The holding apparatuses 200 may, for example, be inserted at the side into the splicing unit 300 via their guide rails 250 (FIG. 3a). A further embodiment option is for the guide rail 250 to be magnetic, as a result of which the holding apparatus is fixed in the splicing unit 300 by magnetic forces. The control of the actual splicing process, for example the striking of an arc, is carried out by means of a control device 13.

After the two optical waveguide sections have been spliced, the shrink sleeve 3 is shrunk onto the optical waveguide sections which have been spliced to one another, in order to protect the splicing point. For this purpose, the two connected optical waveguide sections 1 and 2 are fed with the shrink sleeve arranged over the optical waveguide section 1 to a shrinking oven 500. FIG. 7 shows a transfer station, which is in the form of a bracket 400 which can be rotated, and is fitted to the upper end of the splicing apparatus 1000.

Figure 5C:
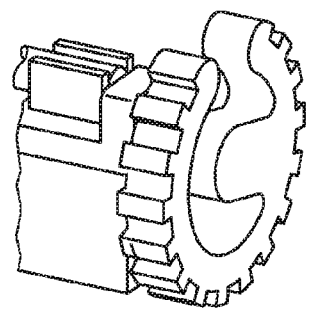
FIG. 5C shows a first position of a rotating apparatus, by means of which an optical waveguide section can be removed from the holding apparatus after a splicing process.

The bracket is first of all rotated such that the two optical waveguide sections which have been spliced to one another can be firmly clamped in two clamping devices 410 and 420 of the bracket. The respective rotating apparatus 240 of the holding apparatuses 200 is then rotated to the position illustrated in FIG. 5C. In this position, the clamping jaw 212 releases the firmly clamped optical waveguide section. The optical waveguide sections which have been spliced to one another can be removed from the two holding apparatuses by means of the bracket 400 through the opening in the rotating apparatus. Both the clamping of the optical waveguide sections which have been spliced to one another in the clamping devices 410 and 420 and the rotation of the rotating apparatuses can be carried out successively using one hand, while the operator's other hand still holds the splicer firmly.

Figure 8:
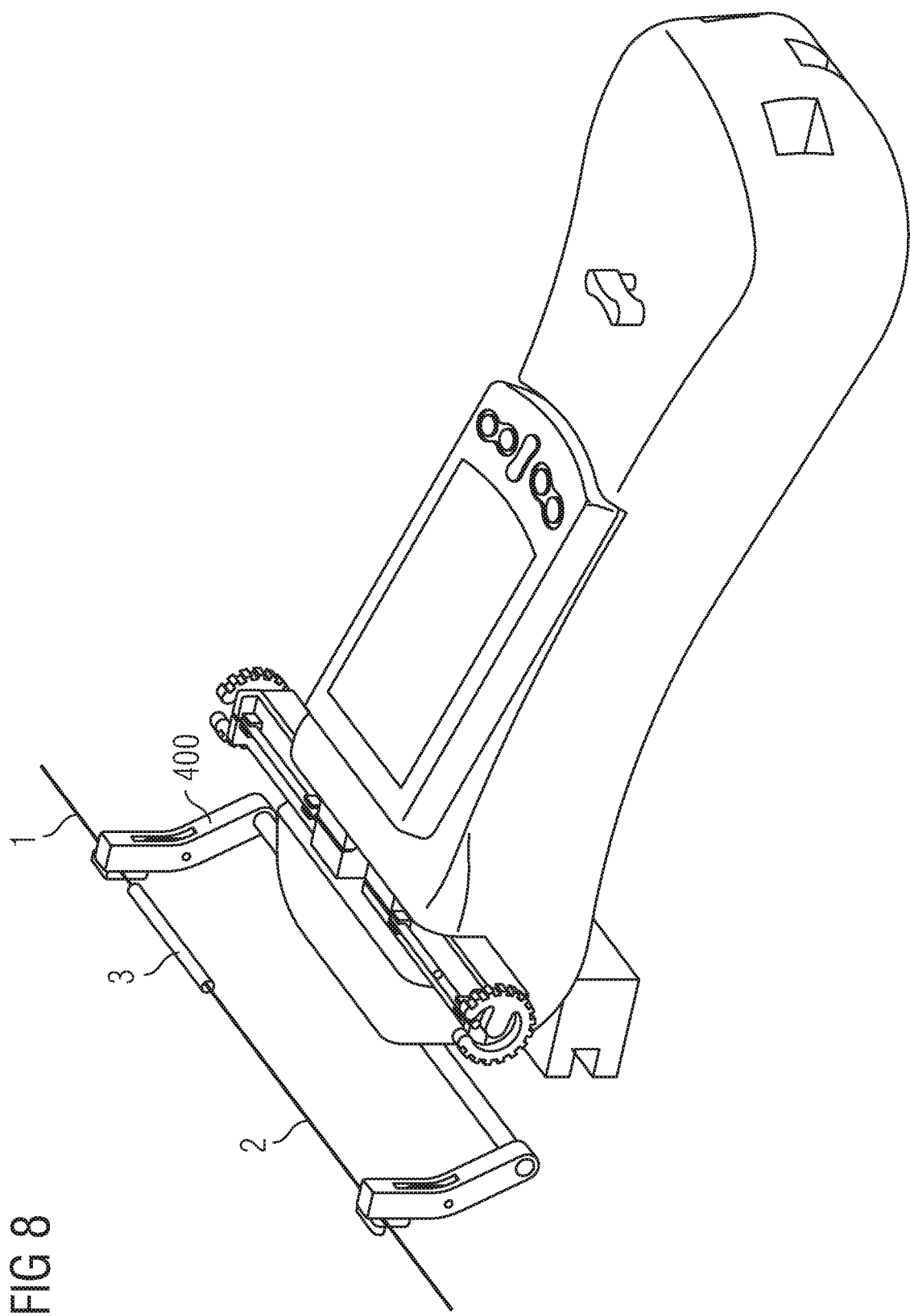
FIG. 8 shows one embodiment of an apparatus for splicing of optical waveguide sections, in which the spliced optical waveguide sections are fed to a shrinking oven by means of a transfer station.
Figure 9:
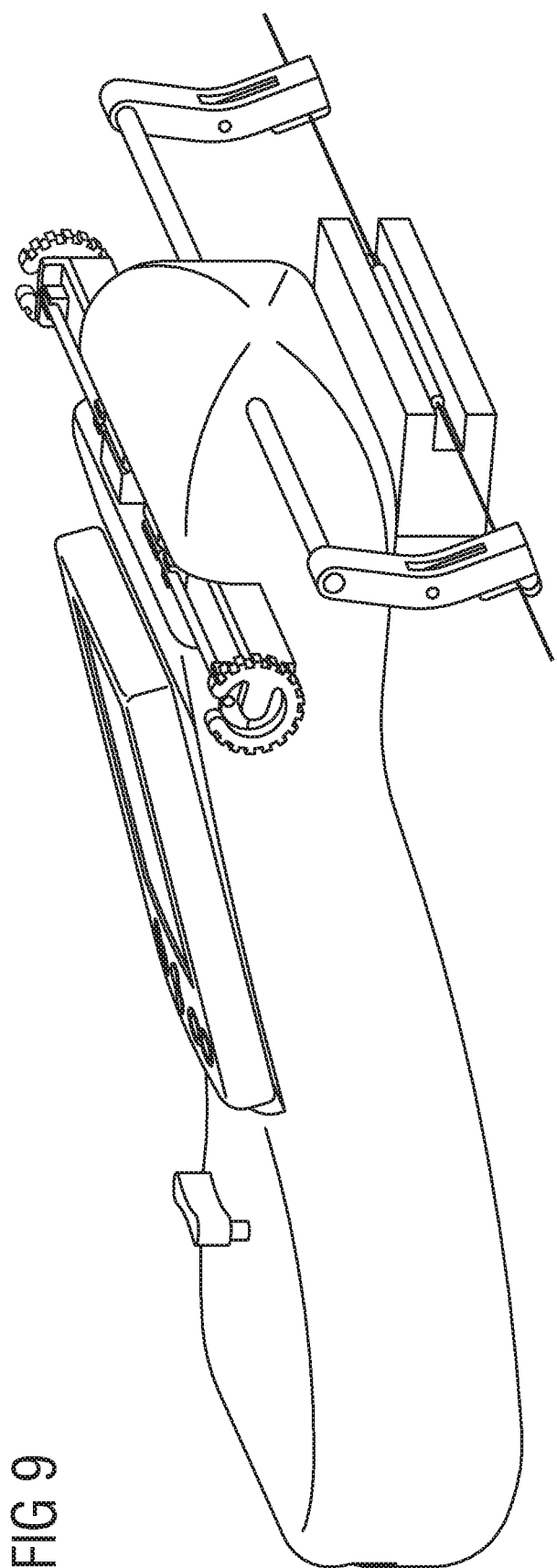
FIG. 9 shows one embodiment of an apparatus for splicing of optical waveguide sections, in which a shrink sleeve is shrunk onto a splicing point in a shrinking oven.

The optical waveguide sections which have been spliced to one another are then fed by rotating the bracket 400 to a shrinking oven 500 which is arranged underneath the splicer (FIG. 9). FIG. 8 shows the removal of the optical waveguide sections, which have been spliced to one another to form an optical waveguide, from the holding apparatuses and the rotation of the bracket, until the spliced optical waveguides are fed, after rotation of the bracket, to the shrinking oven 500, as shown in FIG. 9. When the bracket 400 is in the rotation position shown in FIG. 8, the shrink sleeve, which is initially still arranged in the area of the optical waveguide section 1, can be pulled over the splicing point between the two optical waveguide sections. The bracket 400 is once again rotated using one hand, while the other hand still holds the splicer firmly.

The shrinking process for shrinking the shrink sleeve on over the splicing point can then be controlled by the control device 13. After the shrink sleeve has been shrunk on, the clamping devices 410 and 420 on the bracket which can rotate are released again by means of one hand, such that the optical waveguide sections which have been spliced to one another can be placed, for example, in a splice cassette.

The apparatus disclosed for splicing of optical waveguide sections provides both a splicer and a method for splicing of optical waveguide sections, which make it possible to carry out a splicing process from the preparation of the fibers for the splicing process, through the actual process of splicing the fibers, to a shrink sleeve being shrunk on over the splicing point, using one hand, while the splicing apparatus is held in the operator's other hand. For this purpose, the preprocessing unit, the splicing unit, the shrinking oven and the control unit for controlling the preprocessing unit, the splicing unit and the shrinking oven are integrated in a housing of the apparatus for splicing of the optical waveguide sections. There is therefore no longer any need to place a splicer down at the point of use, which in many cases can be done only with difficultly, because of an unsuitable base.

What is claimed is:

1. A method for carrying out a splicing process, comprising the following steps:
    supporting an apparatus for splicing of optical waveguide sections in one hand for a splicing operation, the apparatus comprising a preprocessing unit that prepares an optical waveguide section for a splicing process, and a splicing unit for splicing the optical waveguide section, wherein the preprocessing unit and the splicing unit are fitted to the apparatus for splicing, the apparatus comprising a housing in which a removal apparatus of the preprocessing unit is located, the housing including an insertion apparatus through which the optical waveguide section is inserted toward the removal apparatus;
    mounting of the optical waveguide section in a holding apparatus such that an end of the optical waveguide section is exposed beyond the holding apparatus;
    attaching the holding apparatus to the preprocessing unit by inserting the end of the optical waveguide section into the insertion apparatus using the holding apparatus thereby providing the end of the optical waveguide section to the removal apparatus enclosed within the housing;
    processing of the optical waveguide section using the removal apparatus of the preprocessing unit by activating a control device;
    release of the holding apparatus from the preprocessing unit;
    attaching the holding apparatus to the splicing unit;
    carrying out the splicing process using the splicing unit by activating the control device, with the optical waveguide section being spliced to another optical waveguide section;
    wherein the insertion apparatus is a first insertion apparatus, the apparatus comprising cleaning fibers in the housing, the housing including another insertion apparatus through which the optical waveguide section is inserted toward the cleaning fibers.

2. The method of claim 1, wherein, during the step of mounting the optical waveguide section in the holding apparatus, the optical waveguide section is inserted into a groove of a clamping apparatus, and the optical waveguide section is then clamped in the groove of the clamping apparatus.

3. The method of claim 2, wherein, in the step of mounting the optical waveguide section in the holding apparatus, the optical waveguide section is clamped in the groove by rotating an eccentric which is coupled to a moving clamping jaw of the clamping apparatus of the holding apparatus.

4. The method of claim 3, wherein, before the step of mounting the optical waveguide section in the holding apparatus, a shrink sleeve is placed in an introduction apparatus of the holding apparatus, and the optical waveguide section is inserted through the shrink sleeve into the groove of the clamping apparatus.

5. The method of claim 4, wherein the optical waveguide section is inserted through a guide opening in the holding apparatus and through the shrink sleeve into the groove of the clamping apparatus, after rotating a rotating apparatus, which is coupled to the eccentric, to a first position,
    wherein the optical waveguide section is clamped in the groove of the clamping apparatus by rotating the rotating apparatus to a second position,
    wherein the optical waveguide section is removed from the holding apparatus after the splicing process by rotating the rotating apparatus to a third position.

6. The method of claim 1, wherein attaching the holding apparatus to the preprocessing unit includes inserting the holding apparatus into the first insertion port apparatus of the housing.

7. The method of claim 1, wherein, in the step of processing the optical waveguide section using the removal apparatus of the preprocessing unit, a coating on the optical waveguide section is removed.

8. The method of claim 7, wherein the coating is removed when the holding apparatus is pulled out of the first insertion apparatus after activating the control device.

9. The method of claim 1, wherein a surface of the optical waveguide section is cleaned when the holding apparatus is pulled out of the another insertion apparatus after activating the control device.

10. The method of claim 1, wherein, the apparatus comprising a cutter in the housing, the housing including another insertion apparatus through which the optical waveguide section is inserted toward the cutter.

11. The method of claim 1, wherein, after the step of carrying out the splicing process, a bracket which can rotate and is arranged on the apparatus is moved to a first rotation position, and the optical waveguide section is attached to the bracket,
    wherein, starting from the first rotation position, the bracket is rotated to a second rotation position, in which it is fed to a shrinking oven for the shrink sleeve to be shrunk on.

12. The method of claim 11, wherein the steps of mounting the optical waveguide section in the holding apparatus, attaching the holding apparatus to the preprocessing unit, processing the optical waveguide section using the removal apparatus, attaching the holding apparatus to the splicing unit, carrying out the splicing process using the splicing unit and rotating the bracket in order to feed the optical waveguide section into the shrinking oven is carried out by another hand.

13. A method for carrying out a splicing process, comprising the following steps:
    providing an apparatus for splicing of optical waveguide sections comprising a splicing unit for splicing of the optical waveguide sections, wherein the splicing unit is fitted to the apparatus;
    mounting the optical waveguide sections in at least one holding apparatus, wherein one optical waveguide section is clamped in a groove of the at least one holding apparatus by rotating an eccentric which is coupled to a moving clamping jaw, the eccentric having a first position for receiving the one optical waveguide section, a second position for clamping the one optical waveguide section and a third position for removing the one optical waveguide section;
    attaching the at least one holding apparatus to the splicing unit;
    carrying out the splicing process using the splicing unit;
    rotating a bracket, which can rotate and is arranged on the apparatus, to a first rotation position;
    releasing the spliced optical waveguide sections from the holding apparatus and attaching the spliced optical waveguide sections to the bracket; and
    rotating the bracket, starting from the first rotation position, to a second rotation position in which the spliced optical waveguide sections are fed to a shrinking oven in order to shrink a shrink sleeve on.

14. The method of claim 13, wherein, before the step of mounting the optical waveguide sections in the at least one holding apparatus, a shrink sleeve is placed in an introduction apparatus of the at least one holding apparatus, and the one optical waveguide section is inserted through the shrink sleeve into the groove.

15. A method for carrying out a splicing process, comprising the following steps:
- providing an apparatus for splicing of optical waveguide sections comprising a preprocessing unit, by means of which an optical waveguide section can be processed in order to prepare for a splicing process, and a splicing unit for splicing the optical waveguide section, wherein the preprocessing unit and the splicing unit are fitted to the apparatus for splicing;
- mounting of the optical waveguide section in a holding apparatus;
- attaching the holding apparatus to the preprocessing unit;
- processing of the optical waveguide section by means of the preprocessing unit by activating a control device;
- releasing the holding apparatus from the preprocessing unit;
- attaching the holding apparatus to the splicing unit; and
- carrying out the splicing process by means of the splicing unit by activating the control device, with the optical waveguide section being spliced to another optical waveguide section;
- wherein, during the step of mounting the optical waveguide section in the holding apparatus,
  - the optical waveguide section is inserted into a groove of a clamping apparatus, and the optical waveguide section is then clamped in the groove by means of the clamping apparatus;
  - the optical waveguide section is clamped in the groove by rotating an eccentric which is coupled to a moving clamping jaw of the clamping apparatus of the holding apparatus;
  - a shrink sleeve is placed in an introduction apparatus of the holding apparatus, and the optical waveguide section is inserted through the shrink sleeve into the groove of the clamping apparatus;
- wherein the optical waveguide section is inserted through a guide opening in the holding apparatus and through the shrink sleeve into the groove of the clamping apparatus, after rotating a rotating apparatus, which is coupled to the eccentric, to a first position;
  - wherein the optical waveguide section is clamped in the groove of the clamping apparatus by rotating the rotating apparatus to a second position; and
  - wherein the optical waveguide section is removed from the holding apparatus after the splicing process by rotating the rotating apparatus to a third position.

16. The method of claim 15, wherein, in order to attach the holding apparatus to the preprocessing unit, the holding apparatus is inserted into an insertion apparatus of the preprocessing unit.

17. The method of claim 15, wherein, in the step of processing the optical waveguide section by means of the preprocessing unit, a coating on the optical waveguide section is removed.

18. The method of claim 17, wherein the coating is removed when the holding apparatus is pulled out of the insertion apparatus after activating the control device.

* * * * *